(12) United States Patent
Shih et al.

(10) Patent No.: US 7,996,052 B2
(45) Date of Patent: Aug. 9, 2011

(54) ELECTRONIC APPARATUS AND FLEXIBLE CIRCUIT BOARD

(75) Inventors: Chin-Chung Shih, Taoyuan (TW); Ching-Shih Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 672 days.

(21) Appl. No.: 12/157,750

(22) Filed: Jun. 13, 2008

(65) Prior Publication Data
US 2009/0027841 A1 Jan. 29, 2009

(30) Foreign Application Priority Data

Jul. 25, 2007 (TW) .............................. 96127144 A

(51) Int. Cl.
*H04M 1/00* (2006.01)

(52) U.S. Cl. ............... 455/575.4; 455/575.3; 455/575.8; 455/90.3; 455/575.1; 379/330

(58) Field of Classification Search ............... 455/575.4, 455/575.1, 575.3, 575.8, 90.3; 379/330
See application file for complete search history.

(56) References Cited

U.S. PATENT DOCUMENTS

| 6,292,561 | B1 * | 9/2001 | Benson | 379/433.13 |
| 7,596,396 | B2 * | 9/2009 | Fagrenius et al. | 455/575.4 |
| 2007/0212920 | A1 * | 9/2007 | Clayton et al. | 439/326 |
| 2010/0004038 | A1 * | 1/2010 | Kwak et al. | 455/575.4 |

FOREIGN PATENT DOCUMENTS

| EP | 1 775 596 A2 | 4/2007 |
| WO | WO 2007/024395 A1 | 3/2007 |

* cited by examiner

*Primary Examiner* — Sanh D Phu
(74) *Attorney, Agent, or Firm* — Knobbe Martens Olson & Bear LLP

(57) ABSTRACT

A flexible circuit board for an electronic apparatus includes a first connecting part and a second connecting part. The first connecting part has a first connecting terminal electrically connected to the first electronic module of the electronic apparatus. The second connecting part has a second connecting terminal electrically connected to the second electronic module of the electronic apparatus. The first connecting part and the second connecting part are not parallel.

19 Claims, 9 Drawing Sheets

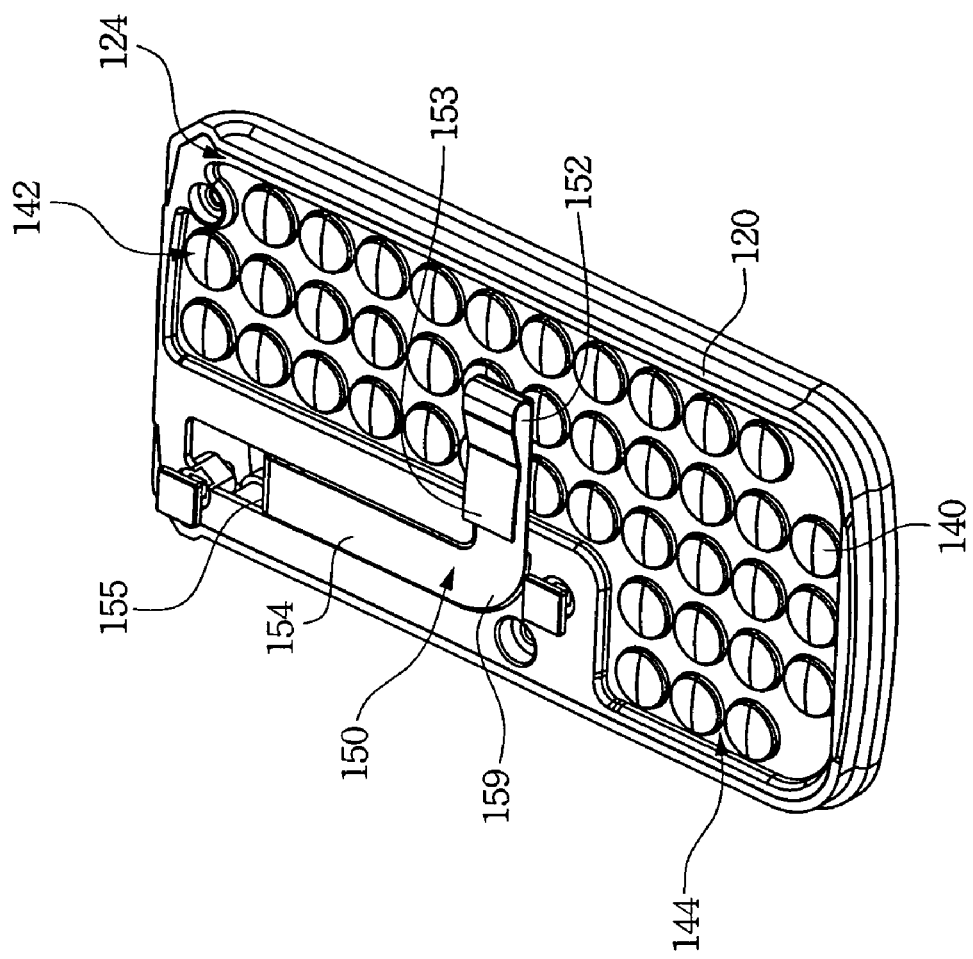
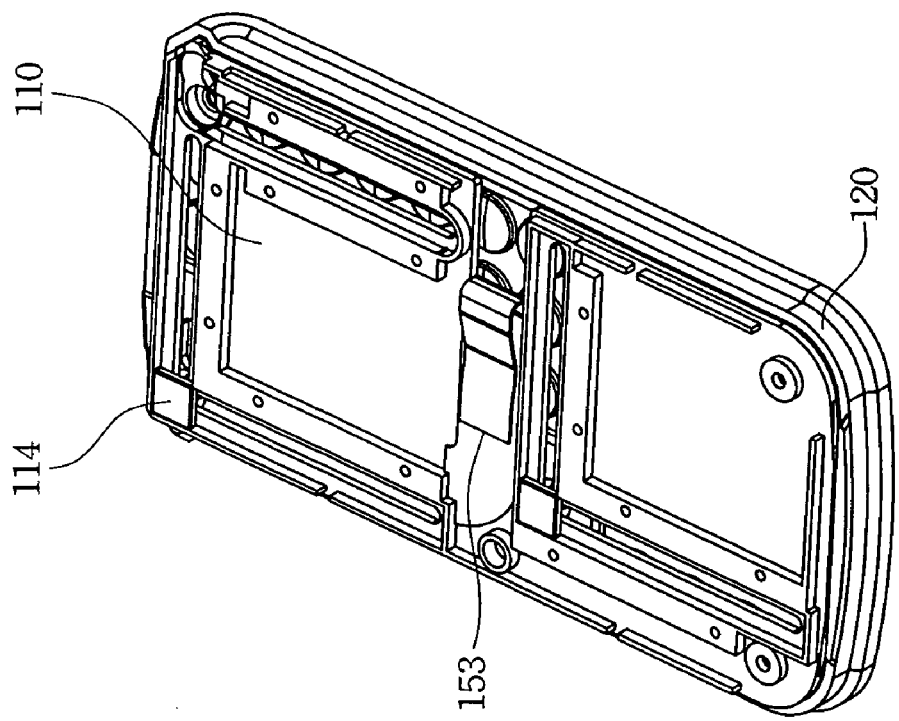
Fig. 2B
Fig. 2A

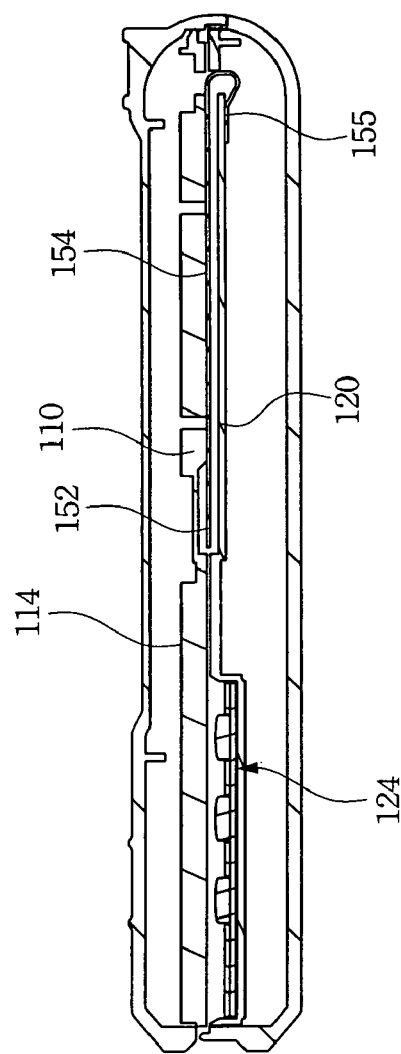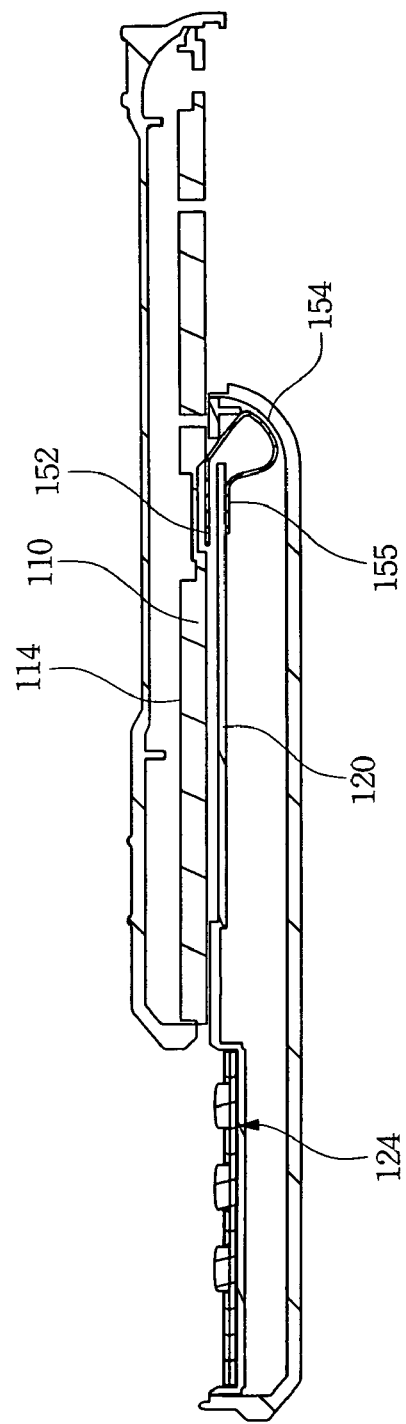

ELECTRONIC APPARATUS AND FLEXIBLE CIRCUIT BOARD

RELATED APPLICATIONS

The present application is based on, and claims priority from, Taiwan Application Serial Number 96127144, filed Jul. 25, 2007, the disclosure of which is hereby incorporated by reference herein in its entirety.

BACKGROUND

1. Field of Invention

The present invention relates to an apparatus. More particularly, the present invention relates to an electronic apparatus and a flexible circuit board thereof.

2. Description of Related Art

Wireless communication has become increasingly sophisticated and now most people carry a cell phone to enable them to communicate with each other. The cell phone has become one of the most important electronic devices for modern people.

The cell phone is so popular today that those cell phone manufacturers make great effort to provide more functions on the cell phone in order to satisfy different user needs. However, it is not easy to integrate those functions in a small cell phone.

In order to increase the surface area of the cell phone, some commercial cell phones can be slid open/close, e.g. a slider cell phone with a keyboard and a display device. In the slider cell phone, the keyboard can provide a QWERTY layout to improve text entry in general, and the display device can also provide an image with an aspect ratio similar to the standard computer image. However, keyboards only having the QWERTY layout are not suitable for dialing numbers in general.

Accordingly, some cell phone manufacturers further provide a kind of cell phone so-called "personal digital assistant (PDA) cell phone", which has two keyboards configured therein. The PDA cell phone has three electronic modules stacked together. A display device, a dial number keyboard and a QWERTY keyboard are respectively disposed on the electronic modules. Furthermore, the PDA cell phone further includes two slider mechanisms with different sliding directions to slide open/close the display device, the dial number keyboard and the QWERTY keyboard.

In order to maintain the electrical connection between the electronic modules during the sliding operation, the PDA cell phone may further include two I shaped flexible circuit boards with different length directions. However, those I shaped flexible circuit boards each can provide only one degree of freedom by folding them. That is, each electronic module of the PDA cell phone can be slid in only one direction. Therefore, manufacturers have to stack three electronic modules such that the display device, the dial number keyboard and the QWERTY keyboard can be slid open/close in different directions. However, one of the most important current requirements for the cell phone is a small size, but the PDA cell phone with three electronic modules has a lager size than the conventional one, especially in thickness, and thus is not convenient for users to take with them.

Accordingly, how to give each electronic module two degrees of freedom to reduce the number of the electronic modules in a cell phone and maintain the electrical connection between them has been an important issue in cell phone industry.

SUMMARY

According to one embodiment of the present invention, an electronic apparatus includes a first electronic module, a second electronic module and a flexible circuit board. The second electronic module is disposed under the first electronic module such that the second electronic module can be slid relative to the first electronic module to form a closed state, a first open state and a second open state. The flexible circuit board is disposed between the first electronic module and the second electronic module. The flexible circuit board includes a first connecting part and a second connecting part. The first connecting part has a first connecting terminal electrically connected to the first electronic module. The second connecting part has a second connecting terminal electrically connected to the second electronic module such that the first electronic module is electrically connected to the second electronic module. The first connecting part and the second connecting part are not parallel.

In use, the first connecting terminal moves relative to the second connecting part when the first electronic module is slid relative to the second electronic module between the closed state and the first open state. On the other hand, the second connecting terminal moves relative to the first connecting part when the first electronic module is slid relative to the second electronic module between the closed state and the second open state.

According to another embodiment of the present invention, a flexible circuit board for an electronic apparatus is provided. The electronic apparatus includes a first electronic module and a second electronic module coupled to the first electronic module such that the second electronic module can be slid relative to the first electronic module to form a closed state, a first open state and a second open state. The flexible circuit board is disposed between the first electronic module and the second electronic module. The flexible circuit board includes a first connecting part and a second connecting part. The first connecting part has a first connecting terminal electrically connected to the first electronic module. The second connecting part has a second connecting terminal electrically connected to the second electronic module. The first connecting part and the second connecting part are not parallel.

In use, the first connecting terminal moves relative to the second connecting part when the first electronic module is slid relative to the second electronic module between the closed state and the first open state. On the other hand, the second connecting terminal moves relative to the first connecting part when the first electronic module is slid relative to the second electronic module between the closed state and the second open state.

BRIEF DESCRIPTION OF THE DRAWINGS

The invention can be more fully understood by reading the following detailed description of the embodiment, with reference made to the accompanying drawings as follows:

FIG. 2A shows the electronic apparatus of FIG. 1A after its display device is removed;

FIG. 2B shows the electronic apparatus of FIG. 1A after its display device and first electronic module is removed;

FIG. 9 is a sectional view of the electronic apparatus of FIG. 1A taken on line 9-9;

FIG. 10 is a sectional view of the electronic apparatus of FIG. 1C taken on line 10-10;

DETAILED DESCRIPTION

Figures 1A, 1B, 1C:
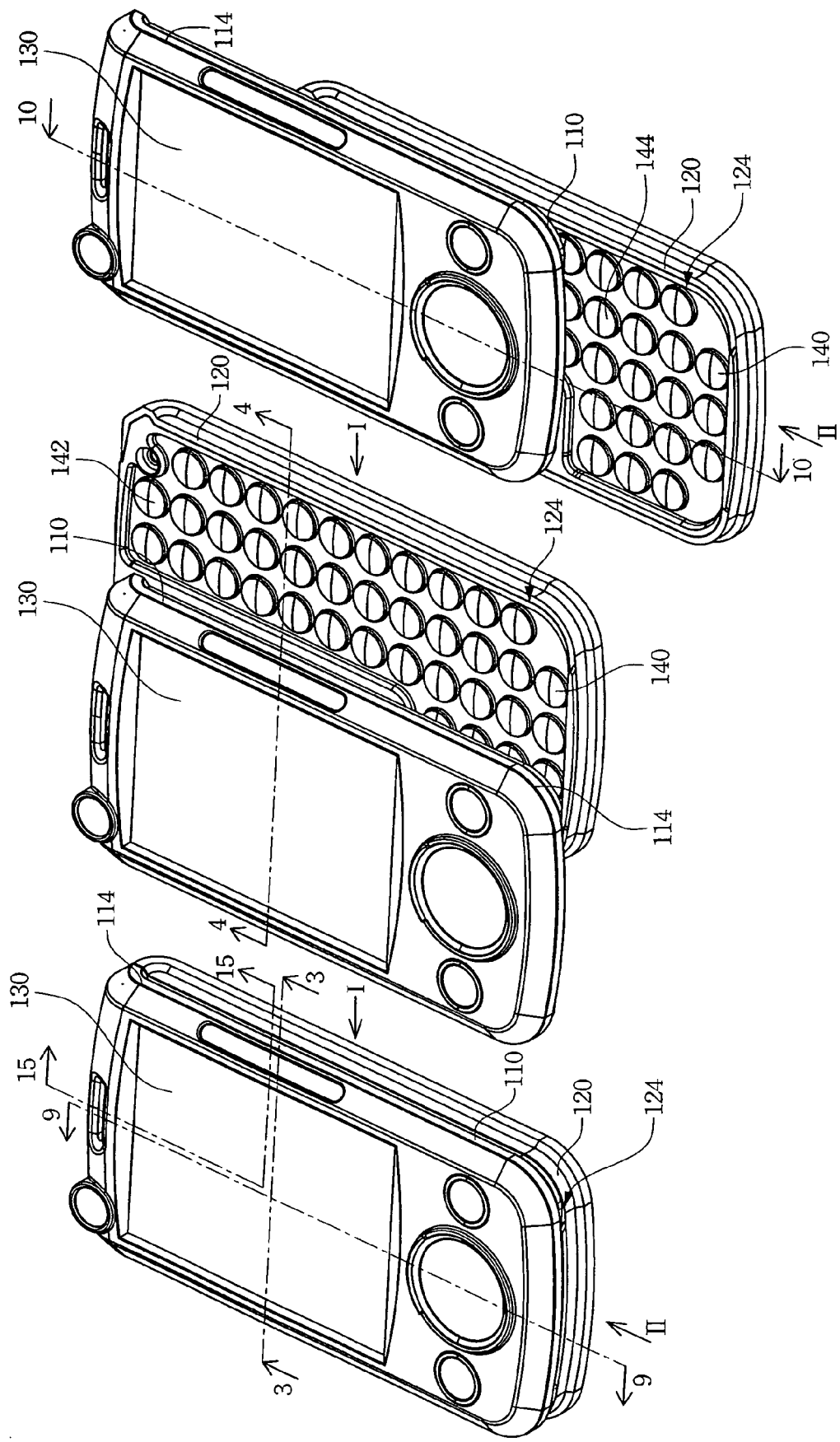
FIG. 1A is a three-dimensional view of an electronic apparatus in a closed state according to one embodiment of the present invention.
FIG. 1B is a three-dimensional view of the electronic apparatus of FIG. 1A in a first open state.
FIG. 1C is a three-dimensional view of the electronic apparatus of FIG. 1A in a second open state.

Reference will now be made in detail to the present embodiments of the invention, examples of which are illustrated in the accompanying drawings. Wherever possible, the same reference numbers are used in the drawings and the description to refer to the same or like parts.

In the following embodiments of the present invention, the term "electronic apparatus" may be considered a personal digital assistant (PDA), an electronic dictionary, a digital camera, a cell phone or other electronic apparatus. The following description will take an electronic apparatus (shown in FIG. 1A) having a first electronic module 110 and a second electronic module 120 as an illustrative example.

FIG. 1A is a three-dimensional view of an electronic apparatus in a closed state according to one embodiment of the present invention. The electronic apparatus includes a display device 130, a first electronic module 110, a second electronic module 120 and a keyboard 140 (shown in FIGS. 1B and 1C). The display device 130 is configured on an upper surface 114 of the first electronic module 110. The keyboard 140 is configured on an upper surface 124 of the second electronic module 120. In the present embodiment, the first electronic module 110 partially conceals the keyboard 140 when the electronic apparatus is in the closed state.

FIGS. 1B and 1C are three-dimensional views of the electronic apparatus of FIG. 1A, showing the electronic apparatus in a first open state and a second open state, respectively. The keyboard 140 may include a full-text input portion 142 and a dial number input portion 144. The full-text input portion 142 of the keyboard 140 is exposed when the electronic apparatus is in the first open state (as shown in FIG. 1B). On the other hand, the dial number input portion 144 of the keyboard 140 is exposed when the electronic apparatus is in the second open state (as shown in FIG. 1C).

In order to maintain the electrical connection between the first electronic module 110 and the second electronic module 120 during the closed state, the first open state and the second open state, the present embodiment provides a flexible circuit board. The structure and the operation of the flexible circuit board will be illustrated with reference to the drawings hereinafter.

FIG. 2A shows the electronic apparatus of FIG. 1A after its display device is removed, and FIG. 2B shows the electronic apparatus of FIG. 1A after its display device and first electronic module is removed. A flexible circuit board 150 for the electronic apparatus includes a first connecting part 152 and a second connecting part 154. The first connecting part 152 has a first connecting terminal 153 electrically connected to the first electronic module 110. The second connecting part 154 has a second connecting terminal 155 electrically connected to the second electronic module 120. The first connecting part 152 and the second connecting part 154 are not parallel. More specifically, the first connecting part 152 and the second connecting part 154 are substantially vertical, but it can be easily understood that the angle between the first connecting part 152 and the second connecting part 154 may be other degree(s) as well. Moreover, the flexible circuit board 150 may have a curved portion 159 connecting the first connecting part 152 and the second connecting part 154.

The first connecting terminal 153 moves relative to the second connecting part 154 when the first electronic module 110 is slid relative to the second electronic module 120 between the closed state and the first open state. The following will illustrate how the first connecting terminal 153 moves relative to the second connecting part 154 with reference to the drawings.

Figure 3:
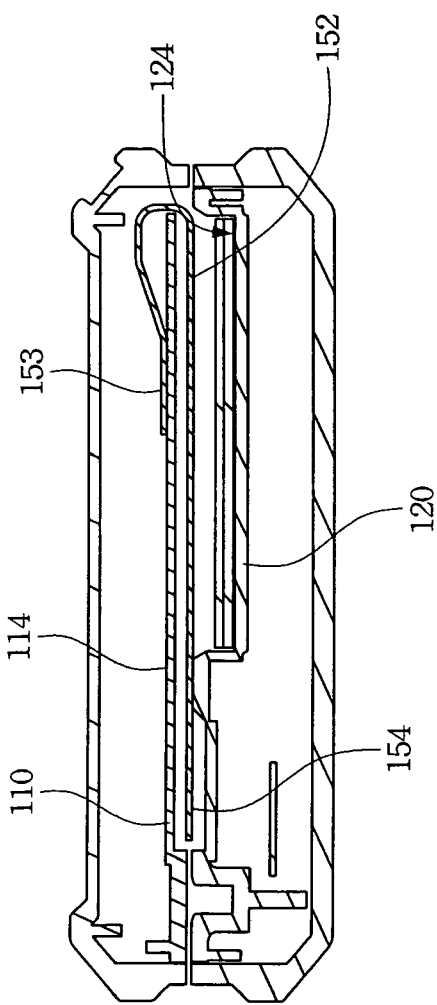
FIG. 3 is a sectional view of the electronic apparatus of FIG. 1A taken on line 3-3.
Figure 4:
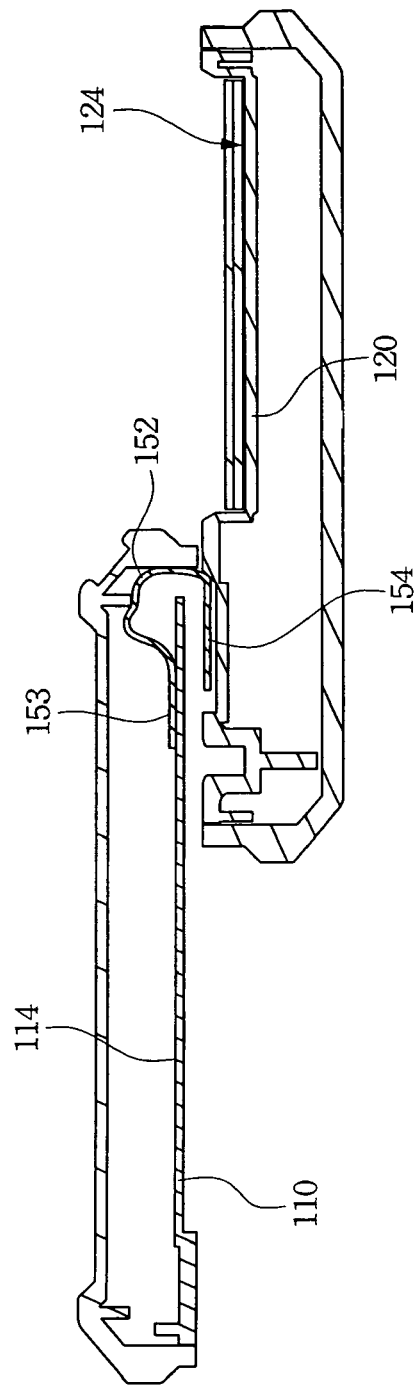
FIG. 4 is a sectional view of the electronic apparatus of FIG. 1B taken on line 4-4.

FIG. 3 is a sectional view of the electronic apparatus of FIG. 1A taken on line 3-3, and FIG. 4 is a sectional view of the electronic apparatus of FIG. 1B taken on line 4-4. In the present embodiment, the first connecting terminal 153 approaches the second connecting part 154 when the first electronic module 110 is slid relative to the second electronic module 120 from the closed state to the first open state. In other words, the first connecting terminal 153 leaves the second connecting part 154 when the first electronic module 110 is slid relative to the second electronic module 120 from the first open state to the closed state.

Figure 5:
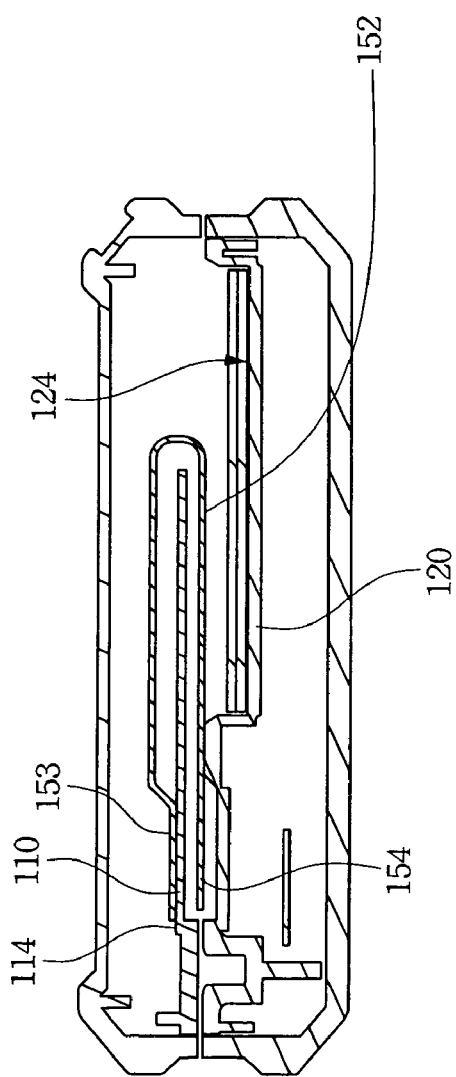
FIGS. 5 and 6 are sectional views of the electronic apparatus according to another embodiment of the present invention similar as taken on line 3-3 as shown in FIG. 1A and line 4-4 as shown in FIG. 1B, showing the electronic apparatus in the closed state and the first open state, respectively.
Figure 6:
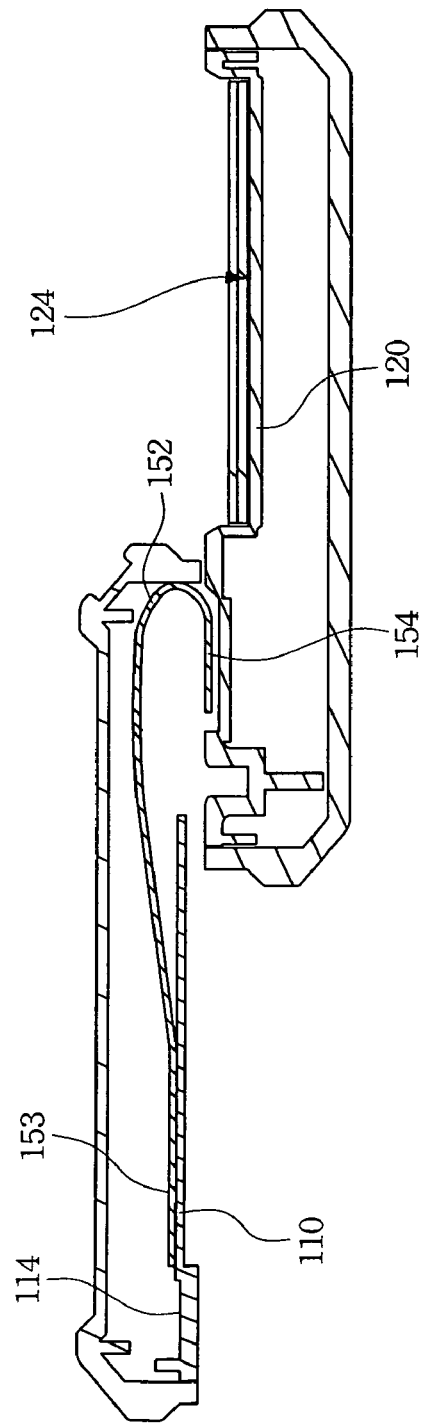

FIGS. 5 and 6 are sectional views of the electronic apparatus according to another embodiment of the present invention similar as taken on line 3-3 as shown in FIG. 1A and line 4-4 as shown in FIG. 1B, showing the electronic apparatus in the closed state and the first open state, respectively. In the present embodiment, the first connecting terminal 153 leaves the second connecting part 154 when the first electronic module 110 is slid relative to the second electronic module 120 from the closed state to the first open state. In other words, the first connecting terminal 153 approaches the second connecting part 154 when the first electronic module 110 is slid relative to the second electronic module 120 from the first open state to the closed state.

Figure 7:
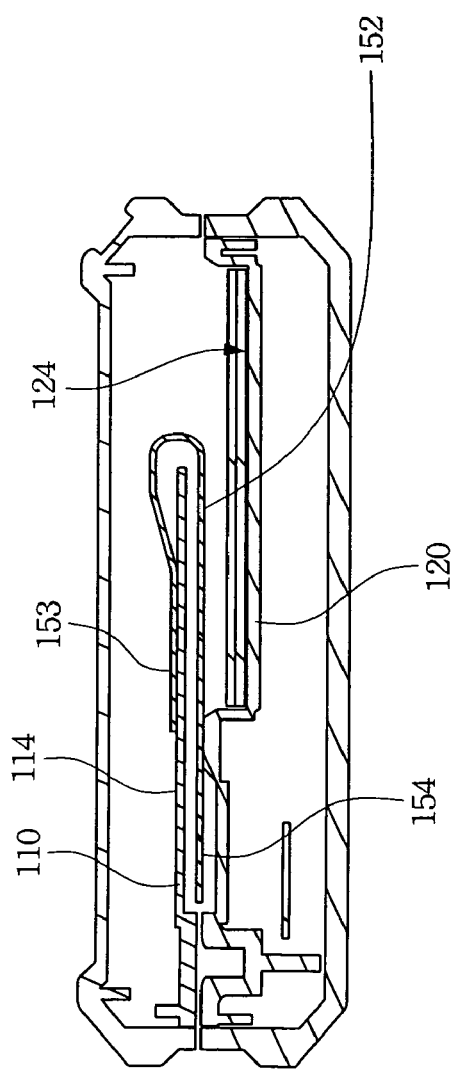
FIGS. 7 and 8 are sectional views of the electronic apparatus according to yet another embodiment of the present invention similar as taken on line 3-3 as shown in FIG. 1A and line 4-4 as shown in FIG. 1B, showing the electronic apparatus in the closed state and the first open state, respectively.
Figure 8:
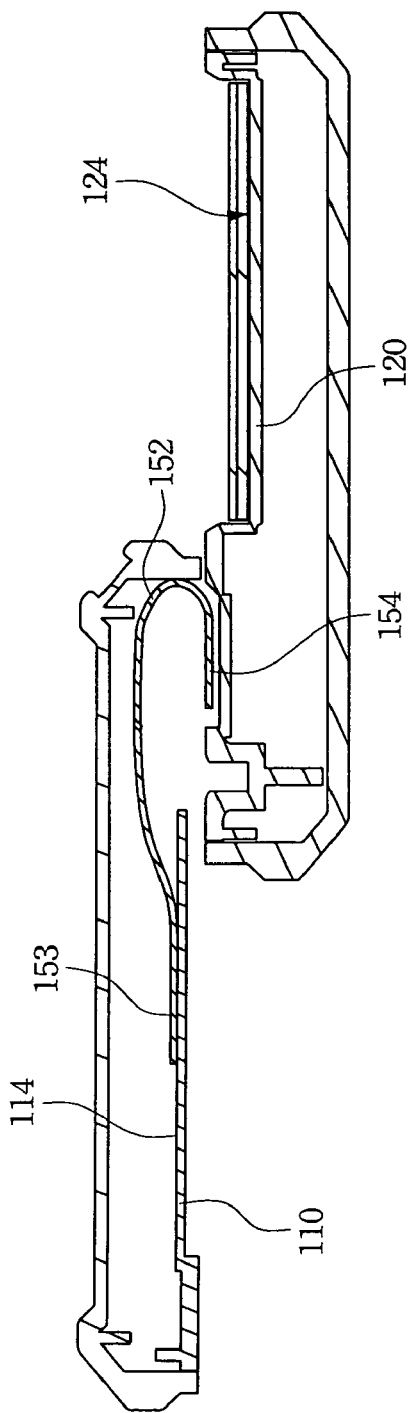

FIGS. 7 and 8 are sectional views of the electronic apparatus according to yet another embodiment of the present invention similar as taken on line 3-3 as shown in FIG. 1A and line 4-4 as shown in FIG. 1B, showing the electronic apparatus in the closed state and the first open state, respectively. In the present embodiment, the first connecting terminal 153 moves across the second connecting part 154 when the first electronic module 110 is slid relative to the second electronic module 120 from the closed state to the first open state. In other words, the first connecting terminal 153 moves across the second connecting part 154 when the first electronic module 110 is slid relative to the second electronic module 120 from the first open state to the closed state.

Altogether, the moving relationship and the relative position between the first connecting terminal 153 and the second connecting part 154 during the closed state and the first open state are shown in FIGS. 3-8.

Moreover, the second connecting terminal 155 may also move relative to the first connecting part 152 when the first electronic module 110 is slid relative to the second electronic module 120 between the closed state and the second open state. The following will illustrate how the second connecting terminal 155 moves relative to the first connecting part 152 with reference to the drawings.

FIG. 9 is a sectional view of the electronic apparatus of FIG. 1A taken on line 9-9, and FIG. 10 is a sectional view of the electronic apparatus of FIG. 1C taken on line 10-10. In the present embodiment, the second connecting terminal 155 approaches the first connecting part 152 when the first electronic module 110 is slid relative to the second electronic module 120 from the closed state to the second open state. In other words, the second connecting terminal 155 leaves the first connecting part 152 when the first electronic module 110 is slid relative to the second electronic module 120 from the second open state to the closed state.

Figure 11:
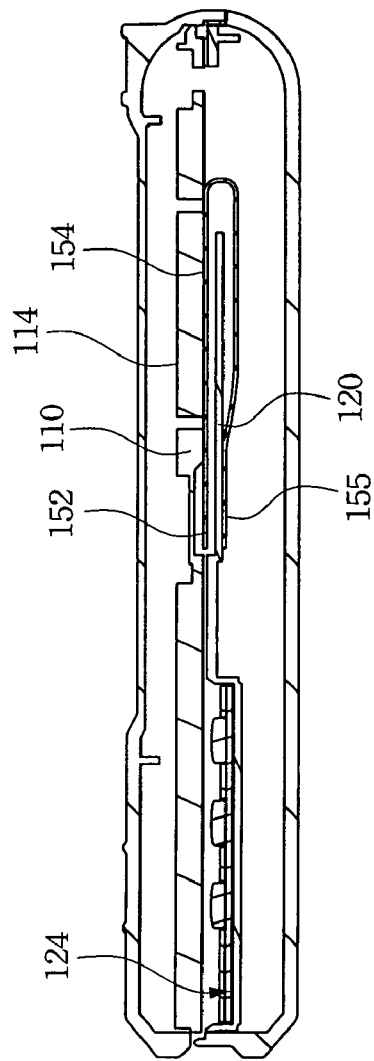
FIGS. 11 and 12 are sectional views of the electronic apparatus according to another embodiment of the present invention similar as taken on line 9-9 as shown in FIG. 1A and line 10-10 as shown in FIG. 1C, showing the electronic apparatus in the closed state and the second open state, respectively.
Figure 12:
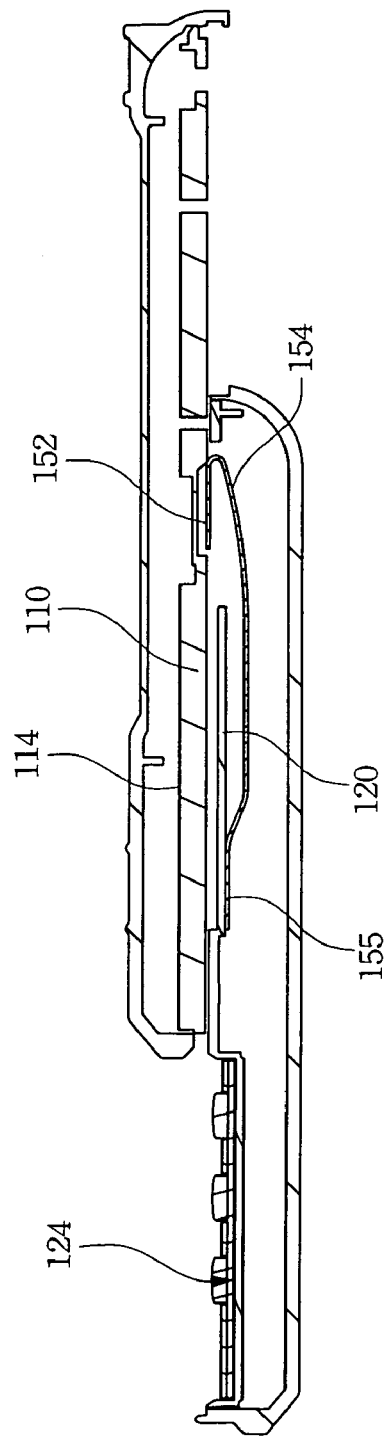

FIGS. 11 and 12 are sectional views of the electronic apparatus according to another embodiment of the present invention similar as taken on line 9-9 as shown in FIG. 1A and line 10-10 as shown in FIG. 1C, showing the electronic apparatus in the closed state and the second open state, respectively. In the present embodiment, the second connecting terminal 155 leaves the first connecting part 152 when the first electronic module 110 is slid relative to the second electronic module 120 from the closed state to the second open state. In other words, the second connecting terminal 155 approaches the first connecting part 152 when the first electronic module 110 is slid relative to the second electronic module 120 from the second open state to the closed state.

Figure 13:
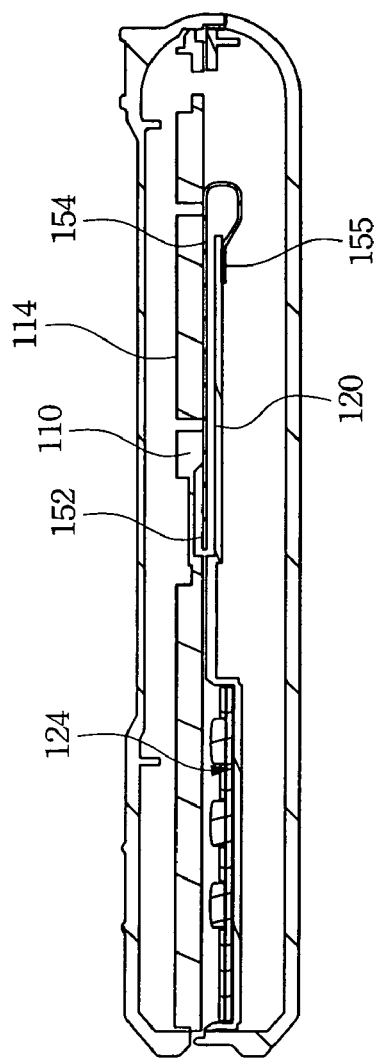
FIGS. 13 and 14 are sectional views of the electronic apparatus according to yet another embodiment of the present invention similar as taken on line 9-9 as shown in FIG. 1A and line 10-10 as shown in FIG. 1C, showing the electronic apparatus in the closed state and the second open state, respectively.
Figure 14:
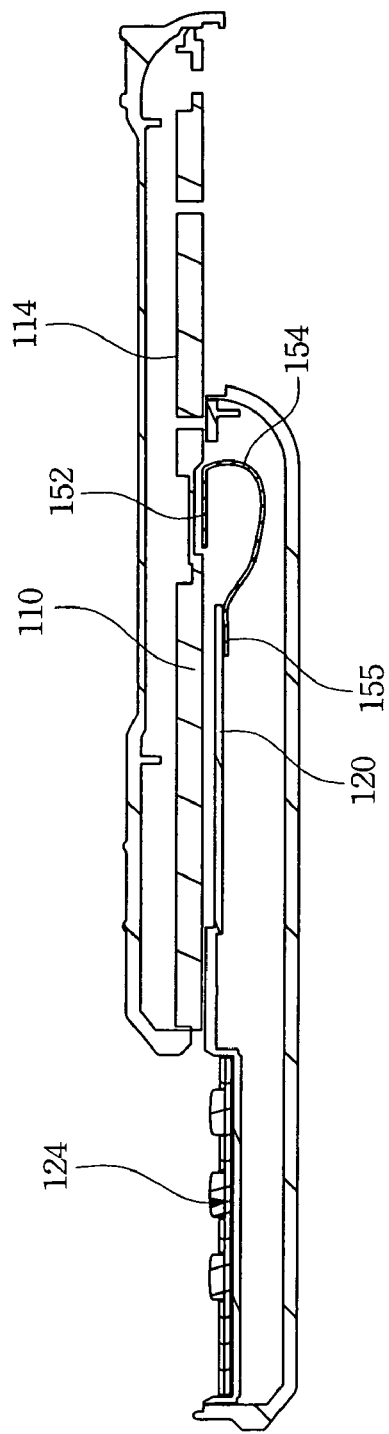

FIGS. 13 and 14 are sectional views of the electronic apparatus according to yet another embodiment of the present invention similar as taken on line 9-9 as shown in FIG. 1A and line 10-10 as shown in FIG. 1C, showing the electronic apparatus in the closed state and the second open state, respectively. In the present embodiment, the second connecting terminal 155 moves across the first connecting part 152 when the first electronic module 110 is slid relative to the second electronic module 120 from the closed state to the second open state. In other words, the second connecting terminal 155 moves across the first connecting part 152 when the first electronic module 110 is slid relative to the second electronic module 120 from the second open state to the closed state.

Altogether, the moving relationship and the relative position between the second connecting terminal 155 and the first connecting part 152 during the closed state and the second open state are shown in FIGS. 9-14.

Reference is made to FIGS. 1A-1C. The first electronic module 110 may be slid in a first direction I relative to the second electronic module 120 between the closed state and the first open state (as shown in FIGS. 1A and 1B), and length direction of the first connecting part 152 (shown in FIG. 2B) may be substantially parallel with the first direction I. Moreover, the first electronic module 110 may be slid in a second direction II relative to the second electronic module 120 between the closed state and the second open state (as shown in FIGS. 1A and 1C), and length direction of the second connecting part 154 (shown in FIG. 2B) may be substantially parallel with the second direction II.

In the present embodiment, the first direction I and the second direction II may be separated at an angle of about 90°. That is, length direction of the first connecting part 152 (shown in FIG. 2B) and length direction of the second connecting part 154 (shown in FIG. 2B) may be separated at an angle of about 90° as well. It is simply understood that the above mentioned angle (degrees) is only an example. In fact, the angle between the first direction I and the second direction II (i.e. the angle between length direction of the first connecting part 152 and length direction of the second connecting part 154) may be other degree(s) as well.

Reference is made to FIGS. 1A-1C. The first electronic module 110 may conceal the flexible circuit board to improve the aesthetic appeal of the electronic apparatus when the display device 130 is exposed and the electronic apparatus is in the closed state, the first open state or the second open state.

Figure 15:
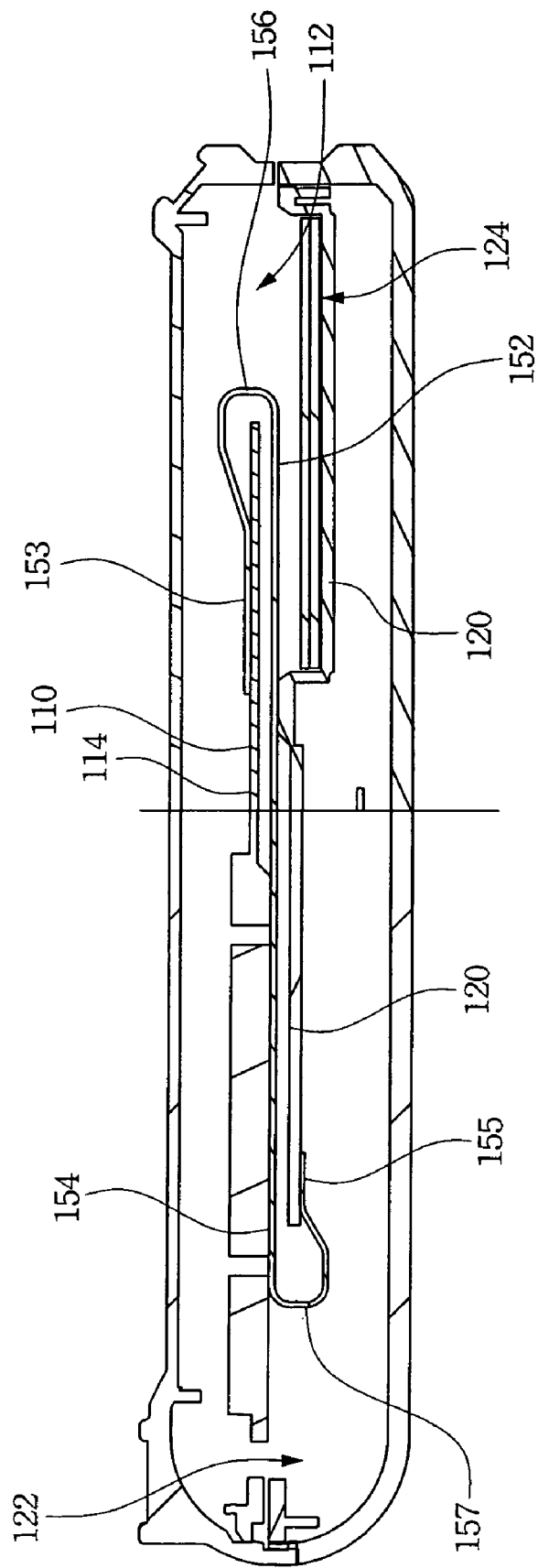
FIG. 15 is a sectional view of the electronic apparatus of FIG. 1A taken on line 15-15.

FIG. 15 is a sectional view of the electronic apparatus of FIG. 1A taken on line 15-15. The first connecting part 152 may have a first curved part 156 providing the first connecting part 152 with a C shaped profile or a lying J shaped profile. On the other hand, the first electronic module 110 may have an opening 112, and the first connecting terminal 153 of the first connecting part 152 may be electrically connected to the first electronic module 110 through the opening 112.

Similarly, the second connecting part 154 may also have a second curved part 157 providing the second connecting part 154 with a C shaped profile or a lying J shaped profile. The second electronic module 120 may have an opening 122, and the second connecting terminal 155 of the second connecting part 154 may be electrically connected to the second electronic module 120 through the opening 122.

In conclusion, the electronic apparatus of the above embodiments employs the flexible circuit board to be slid open/close in at least two directions. That is, the flexible circuit board can electrically connect the electronic modules of the electronic apparatus during the sliding operation. Furthermore, the first connecting part and the second connecting part of the flexible circuit board are located on the same plane, and thus only two electronic modules is needed to achieve sliding open/close in different directions. Accordingly, the electronic apparatus of the above embodiments will have a thinner thickness and a smaller size than the conventional PDA cell phone, It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic apparatus, comprising:
   a first electronic module;
   a second electronic module disposed under the first electronic module such that the second electronic module can be slid relative to the first electronic module to form a closed state, a first open state and a second open state; and
   a flexible circuit board disposed between the first electronic module and the second electronic module and comprising:
      a first connecting part having a first connecting terminal electrically connected to the first electronic module; and
      a second connecting part having a second connecting terminal electrically connected to the second electronic module such that the first electronic module is electrically connected to the second electronic module, wherein the first connecting part and the second connecting part are not parallel such that the first connecting terminal moves relative to the second connecting part when the first electronic module is slid relative to the second electronic module between the closed state and the first open state, and the second connecting terminal moves relative to the first connecting part when the first electronic module is slid relative to the second electronic module between the closed state and the second open state.

2. The electronic apparatus of claim 1, wherein the first electronic module is slid in a first direction relative to the second electronic module to form the closed state and the first open state, and the first electronic module is slid in a second direction relative to the second electronic module to form the closed state and the second open state.

3. The electronic apparatus of claim 2, wherein the first direction and the second direction are separated at an angle of about 90°.

4. The electronic apparatus of claim 2, wherein length direction of the first connecting part is substantially parallel with the first direction.

5. The electronic apparatus of claim 2, wherein length direction of the second connecting part is substantially parallel with the second direction.

6. The electronic apparatus of claim 1, wherein the flexible circuit board comprises a curved portion connecting the first connecting part and the second connecting part.

7. The electronic apparatus of claim 1, wherein length direction of the first connecting part and length direction of the second connecting part are separated at an angle of about 90°.

8. The electronic apparatus of claim 1, wherein the first connecting part has a first curved part providing the first connecting part with a C shaped profile or a lying J shaped profile and the first electronic module has an opening, and the first connecting terminal of the first connecting part is electrically connected to the first electronic module through the opening.

9. The electronic apparatus of claim 1, wherein the second connecting part has a second curved part providing the second connecting part with a C shaped profile or a lying J shaped profile and the second electronic module has an opening, and the second connecting terminal of the second connecting part is electrically connected to the second electronic module through the opening.

10. The electronic apparatus of claim 1, further comprising:
a display device configured on an upper surface of the first electronic module; and
a keyboard configured on an upper surface of the second electronic module, wherein the first electronic module partially conceals the keyboard when the electronic apparatus is in the closed state.

11. The electronic apparatus of claim 10, wherein the keyboard has a full-text input portion and the full-text input portion of the keyboard is exposed when the electronic apparatus is in the first open state.

12. The electronic apparatus of claim 10, wherein the keyboard has a dial number input portion and the dial number input portion of the keyboard is exposed when the electronic apparatus is in the second open state.

13. A flexible circuit board for an electronic apparatus, which includes a first electronic module and a second electronic module coupled to the first electronic module such that the second electronic module can be slid relative to the first electronic module to form a closed state, a first open state and a second open state, disposed between the first electronic module and the second electronic module, the flexible circuit board comprising:
a first connecting part having a first connecting terminal electrically connected to the first electronic module; and
a second connecting part having a second connecting terminal electrically connected to the second electronic module, wherein the first connecting part and the second connecting part are not parallel such that the first connecting terminal moves relative to the second connecting part when the first electronic module is slid relative to the second electronic module between the closed state and the first open state, and the second connecting terminal moves relative to the first connecting part when the first electronic module is slid relative to the second electronic module between the closed state and the second open state.

14. The flexible circuit board of claim 13, wherein the first connecting terminal approaches, leaves or moves across the second connecting part when the first electronic module is slid relative to the second electronic module from the closed state to the first open state.

15. The flexible circuit board of claim 13, wherein the first connecting terminal approaches, leaves or moves across the second connecting part when the first electronic module is slid relative to the second electronic module from the first open state to the closed state.

16. The flexible circuit board of claim 13, wherein the second connecting terminal approaches, leaves or moves across the first connecting part when the first electronic module is slid relative to the second electronic module from the closed state to the second open state.

17. The flexible circuit board of claim 13, wherein the second connecting terminal approaches, leaves or moves across the first connecting part when the first electronic module is slid relative to the second electronic module from the second open state to the closed state.

18. The flexible circuit board of claim 13, further comprising a curved portion connecting the first connecting part and the second connecting part.

19. The flexible circuit board of claim 13, wherein length direction of the first connecting part and length direction of the second connecting part are separated at an angle of about 90.

* * * * *